United States Patent [19]

Jensen et al.

[11] Patent Number: 4,834,624
[45] Date of Patent: May 30, 1989

[54] PUMP ASSEMBLY FOR DELIVERING LIQUIDS AND GASES

[75] Inventors: Niels D. Jensen; Michal Rasmussen; Peder Jensen, all of Bjerringbro, Denmark

[73] Assignee: Grundfos International A/S, Bjerringbro, Denmark

[21] Appl. No.: 131,827

[22] Filed: Dec. 11, 1987

[30] Foreign Application Priority Data

Dec. 13, 1986 [DE] Fed. Rep. of Germany ....... 3642729

[51] Int. Cl.$^4$ ............................................. F04B 39/06
[52] U.S. Cl. .................................... 417/370; 417/369; 417/423.8
[58] Field of Search ........................ 417/45, 366-372, 417/423 E, 423 H, 423 A, 271, 247; 310/52, 54, 62, 63

[56] References Cited

U.S. PATENT DOCUMENTS

| | | |
|---|---|---|
| 3,195,035 | 7/1965 | Sudmeier .................. 417/372 X |
| 3,878,809 | 4/1975 | Ray ............................ 310/62 X |
| 3,891,355 | 6/1975 | Hecht et al. ............... 310/63 X |
| 4,210,835 | 7/1980 | Neveux ........................ 310/62 |
| 4,221,982 | 9/1980 | Raver et al. . | |
| 4,527,960 | 7/1985 | De Sisto .................... 417/423 A |
| 4,659,290 | 4/1987 | Kundert ...................... 417/32 |
| 4,659,951 | 4/1987 | Angi et al. ................. 310/62 |
| 4,712,030 | 12/1987 | Lakin et al. .............. 310/64 X |

FOREIGN PATENT DOCUMENTS

| | | |
|---|---|---|
| 125834 | 11/1984 | European Pat. Off. . |
| 1808856 | 5/1973 | Fed. Rep. of Germany . |
| 2364773 | 7/1974 | Fed. Rep. of Germany . |
| 3443024 | 6/1986 | Fed. Rep. of Germany . |
| 3115714 | 11/1986 | Fed. Rep. of Germany . |
| 651111 | 8/1985 | Switzerland . |
| 1143749 | 2/1969 | United Kingdom . |
| 1187866 | 4/1970 | United Kingdom . |
| 1198780 | 7/1970 | United Kingdom . |
| 2046029 | 5/1980 | United Kingdom . |
| 1603976 | 12/1981 | United Kingdom . |
| 2127901 | 4/1984 | United Kingdom . |
| 2162898 | 2/1986 | United Kingdom . |

OTHER PUBLICATIONS

IBM Technical Disclosure Bulletin, 18, No. 5, 1387, 1388 (1975).

Primary Examiner—Leonard E. Smith
Assistant Examiner—Eugene L. Szczecina, Jr.
Attorney, Agent, or Firm—Michael N. Meller

[57] ABSTRACT

A pump assembly for delivering liquids or gases include a pump and an electromotor for driving the pump, the speed and/or torque of the electromotor being made variable by a static frequency converter. The frequency converter can be miniaturized by highly-integrated circuits and other provisions for a sufficient emission of dissipation heat. The frequency converter is arranged inside or on the pump assembly, forming a structural unit with pump assembly, and the dissipation heat of the frequency converter is emitted by the fluid delivered or to be delivered by the pump assembly, the fluid acting as dissipator.

7 Claims, 4 Drawing Sheets

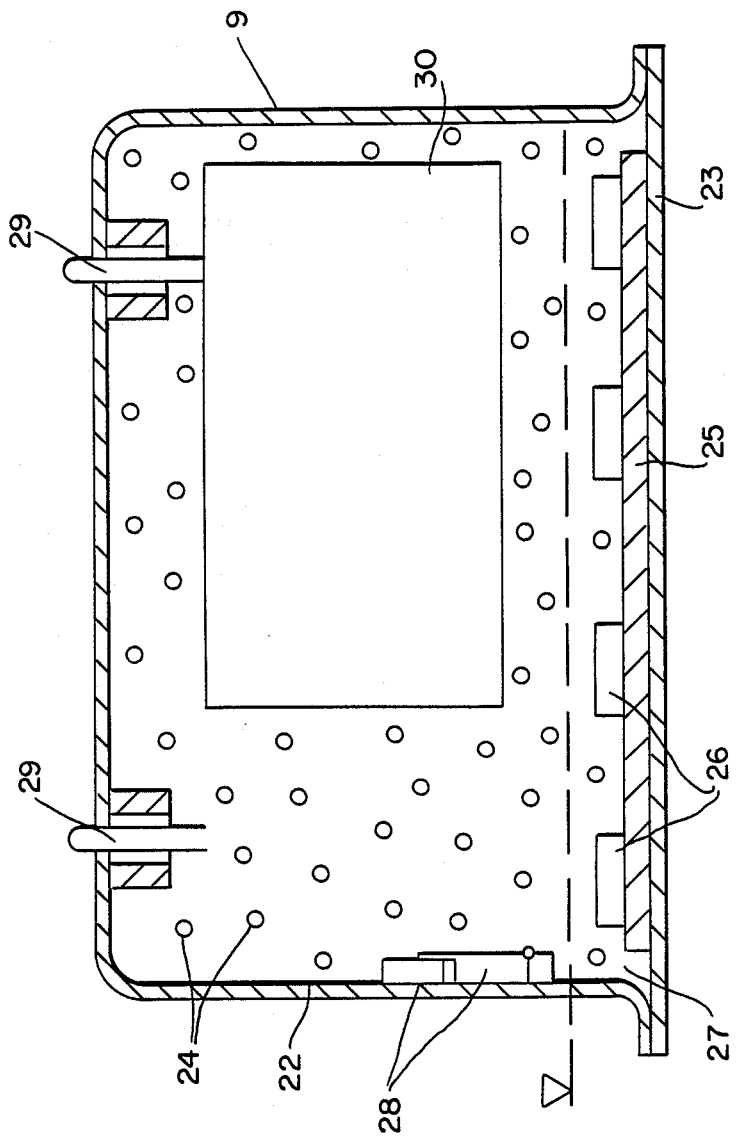

PUMP ASSEMBLY FOR DELIVERING LIQUIDS AND GASES

FIELD OF THE INVENTION

The invention relates to a pump assembly for delivering liquids or gases, comprising a pump and an electromotor driving the pump, the speed and/or torque of said electromotor being variable by means of a static frequency converter.

BACKGROUND ART

Pumps are the most frequent machines in engineering. In technical literature hydraulic pumps as well as ventilators and blast engines working with low pressure ratios are classed as "pumps". During the designing of the machine there is this no need to take the compressability of the fluid to be delivered into consideration.

Both the positive displacement pump as well as the fluid flow pump follow the known model laws, i.e. for the positive displacement pump it holds that $P \sim n \cdot D^3$ and for the fluid flow pump it holds that $P \sim n^3 \cdot D^5$, where P is power, n is speed of rotation and D are the characteristic dimensions of the energy-transfering module of the machine. It is evident that the power of a positive displacement pump increases linear with the speed of rotation, whereas the power of a fluid flow pump increases with the third power of the speed of rotation. In the following we refer to fluid flow pumps, although the invention also relates to the two types of machines mentioned above. The model laws illustrate the effect of speed on the hydraulic power of the machine in question. Consequently, it is of considerable advantage with regard to dimensions, weight, price and often efficiency of a pump assembly to operate a pump at high speeds.

When driving a pump by means of an electromotor the speed of the pump is in most cases directly dependent on the frequency of the main circuit. That is the reason why frequency converters are increasingly employed. Such a converter has further advantages. It allows, for example, the simultaneous operation of structurally equal assemblies of different speeds for the execution of different tasks while at the same time reducing the stock of spare parts. Furthermore the user is no longer forced to exactly compute the characteristic curve of the assembly in advance, since the requirements of the assembly are met substantially lossless by choosing the correct speed. Finally, it is possible to deliver various products in the same system without exchanging the assembly by simply altering the speed. This is often necessary in chemical plants.

A prerequisite for providing these advantageous is the installation of frequency converters. Known converters have to be installed apart from the pump assembly, since they are bulky and expensive. The price of a frequency converter normally increases the price of a pump assembly considerably, especially in the low-power range. A further disadvantage of known converters is interference with the ambient due to electromagnetic fields generated by the cable between a frequency converter and a pump assembly. This is only avoidable by extensive shielding, thus further curtailing the mobility of the pump assembly.

SUMMARY OF THE INVENTION

The object of the invention is to provide a frequency-controlled pump assembly, especially for small and medium power outputs, said assembly being inexpensive and thus universally applicable, thus using the above advantages for a broad spectrum of applications. Moreover, the savings in material and energy in such pump assemblies reduce the environmental load.

In satisfaction of the foregoing object and advantages, the above pump assembly is according to the invention provided with a frequency converter miniaturized by highly integrated circuits, arranged inside or on the pump assembly and forming a structural unit with said pump assembly, the dissipation heat of said frequency converter being emitted by the fluid delivered or to be delivered by the pump assembly, said fluid acting as dissipator.

The power of such an assembly and also the energy losses emitted in the form of dissipation heat increase with the third power of the linear dimensions of the assembly. The surface for emitting dissipation heat to the ambient only increases with the second power of the linear dimensions of the assembly. Consequently, any heat-generating object with a predetermined power output has to be of a defined minimum size. On the one hand, said size depends on the temperature difference between the heat source of the object and the dissipator, i.e. either the ambient or the coolant, and, on the other hand, on the size of the thermal resistance of the flow path. The lower the thermal resistance the smaller are the dimensions of the assembly.

This discourse is important for the understanding of the theoretical background of the invention. The field of electronics allows very small dimensions of assemblies if the admissible operating temperature is not exceeded. The temperature limit can be kept when decreasing the dimensions of the assembly, if dissipators of low temperatures are found and the heat transmission coefficient for the surface emitting the dissipation heat is increased.

Installing a frequency converter in or on a pump assembly enables the use of the delivered fluid or the fluid to be delivered as dissipator in a simple way. In known, separately installed frequency converters the dissipation heat is emitted to the ambient air by free convection, whereas heat losses can now be emitted by forced convection e.g. with turbulent fluid flow. When cooling with water the heat transmission coefficient is two to three orders of magnitude above heat transmission coefficients in the case of free convection.

It is often advantageous to install the frequency converter in a bypass of the pump instead of entirely or partially in the flow path of the fluid, especially when delivering hot fluids. The flow in the bypass can be used as coolant and dissipator for the frequency converter after emission of heat to the ambient.

For rough operation the frequency converter is situated between the pump and the electromotor. In order to improve heat emission, ducted cooling is provided by means of a ventilator or the clutch between the motor and the pump representing a rotor. It is also possible to connect the frequency converter to a separate cooling system.

A further possibility for reducing the heat resistance and improving the heat dissipation is, e.g. to form the frequency converter, its housing and the free housing space in a special way. Thus, the housing of the frequency converter is a capsule pressure-resistant and leakproof towards the ambient and at least partially provided with a filling acting as heat conductor for the dissipation heat emitted to the surface of the capsule. If high external pressures are expected, the filling can stabilize the shape of the capsule, while the wall of the capsule is still comparatively thin in order to ensure good heat transmission. Usually, the filling is a dielectric material, such as a pourable solid or a liquid.

The filling can also be a pourable solid with a liquid, the latter filling part of the space between the solid particles for foaming a heat-pipe system in such a way that the liquid vaporizes where the dissipation heat is developed and the vapor condenses on the inner surface of the capsule while emitting condensation heat. The condensate can then flow back to the area where the dissipation heat is developed.

The output signal of some types of frequency converters is varied by actuating circuit elements. These circuit elements are not easily accessible in encapsulated frequency converters. Consequently, said elements are to be indirectly actuated from the outside of the wall of the capsule either mechanically or electromagnetically.

BRIEF DESCRIPTION OF THE DRAWINGS

Further possibilities and advantages of the inventive pump assembly are described in greater detail below with reference to the accompanying drawings, in which FIG. 3 is a partially sectional view of a centrifugal pump and FIG. 4 is a sectional view of the frequency converter.

DESCRIPTION OF THE PREFERRED EMBODIMENTS

Figure 1:
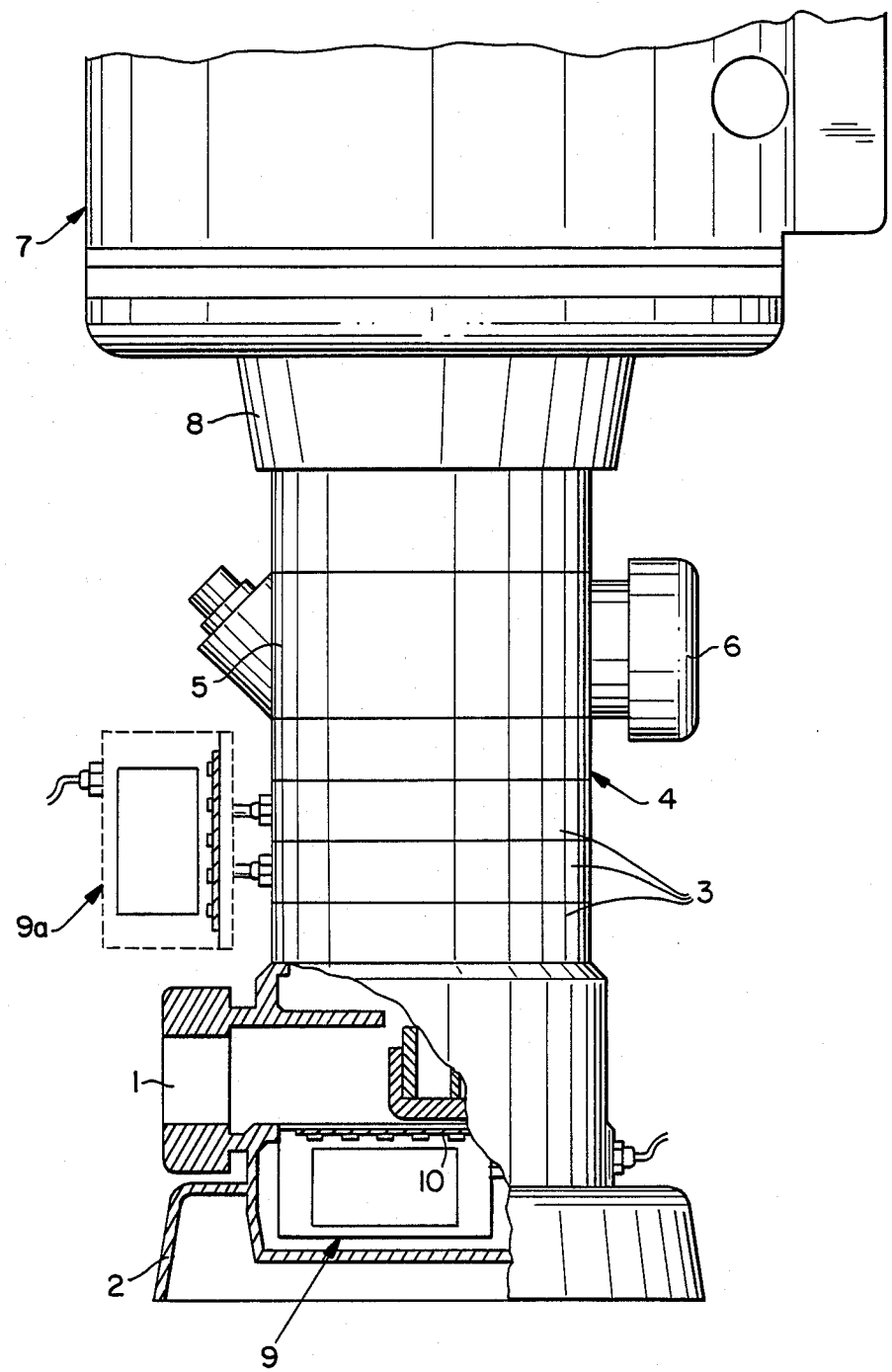
FIG. 1 is a partially sectional side view of an erect multi-step centrifugal pump assembly.

According to FIG. 1 the water to be delivered enters a stator 2 of a pump via a suction muff 1, flows through pump steps 3 of a pump 4, said steps being provided with rotors, and leaves the pump through a pressure muff 6 in a top 5 of the pump. A motor 7 driving the pump is connected to the top 5 of the pump by means of a connecting piece 8. The shaft ends of the motor and the pump as well as the clutch of the connecting piece 8 are covered and thus not visible.

In this embodiment a frequency converter 9, miniaturized by means of highly integrated circuits, is situated in the pump stator 2. Part of the surface of the converter is in the flow path of the water entering the pump 4 via the suction muff 1. The frequency converter emits part of its dissipation heat to the water via a wall 10.

FIG. 1 also illustrates a further possibility for arranging a frequency converter 9a (see dashed lines). In this embodiment the frequency converter is situated in a bypass of two pump steps 3 and cooled by means of a partial flow of the water delivered by the pump. Here the water diverted through the bypass flows through cooling channels (not shown) in the frequency converter and returns to the pump 4 after having absorbed the dissipation heat.

Figure 2:
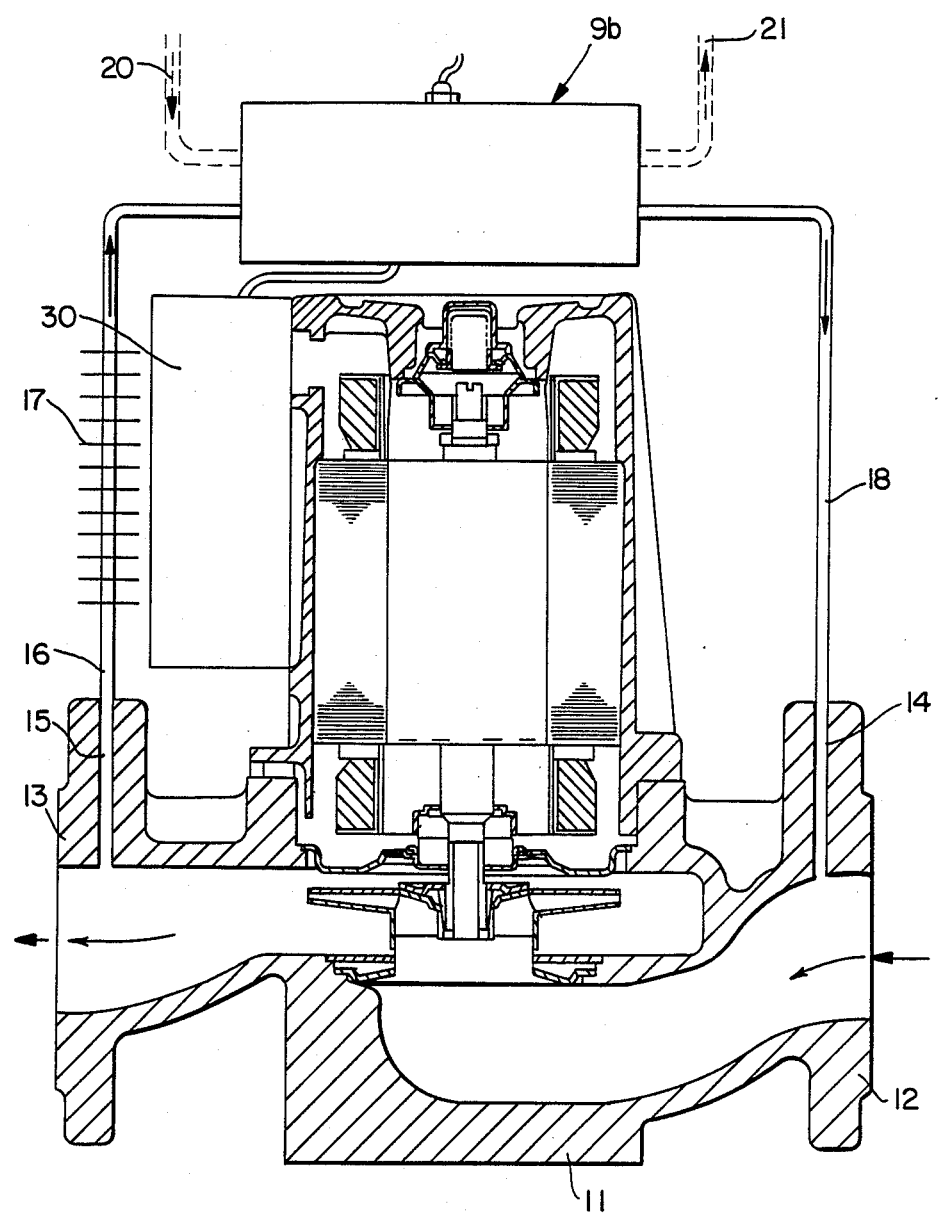
FIG. 2 is an axial section through a pump assembly with wet motor.

Another arrangement of the frequency converter in the bypass is shown in FIG. 2. The inline pump assembly illustrated in FIG. 2 is well-known and does not require further explanation. A housing 11 of a single-step pump is usually provided with bores 14 and 15 at a suction muff 12 and a pressure muff 13 respectively for measuring the pressure difference. If a connection 16, preferably provided with cooling ribs 17 in a predetermined area, is established from the bore 15 to the frequency converter 9b and another connection 18 is returned to the bore 14, the frequency converter is situated in the bypass to the pump. In this case the frequency converter is also cooled by the fluid during hot water delivery, since the partial flow through the bypass emits most of its heat to the ambient via the connection 16 and the cooling ribs 17. The temperature level of the fluid is thus so far reduced that it can be used as coolant for the frequency converter.

Figure 3:
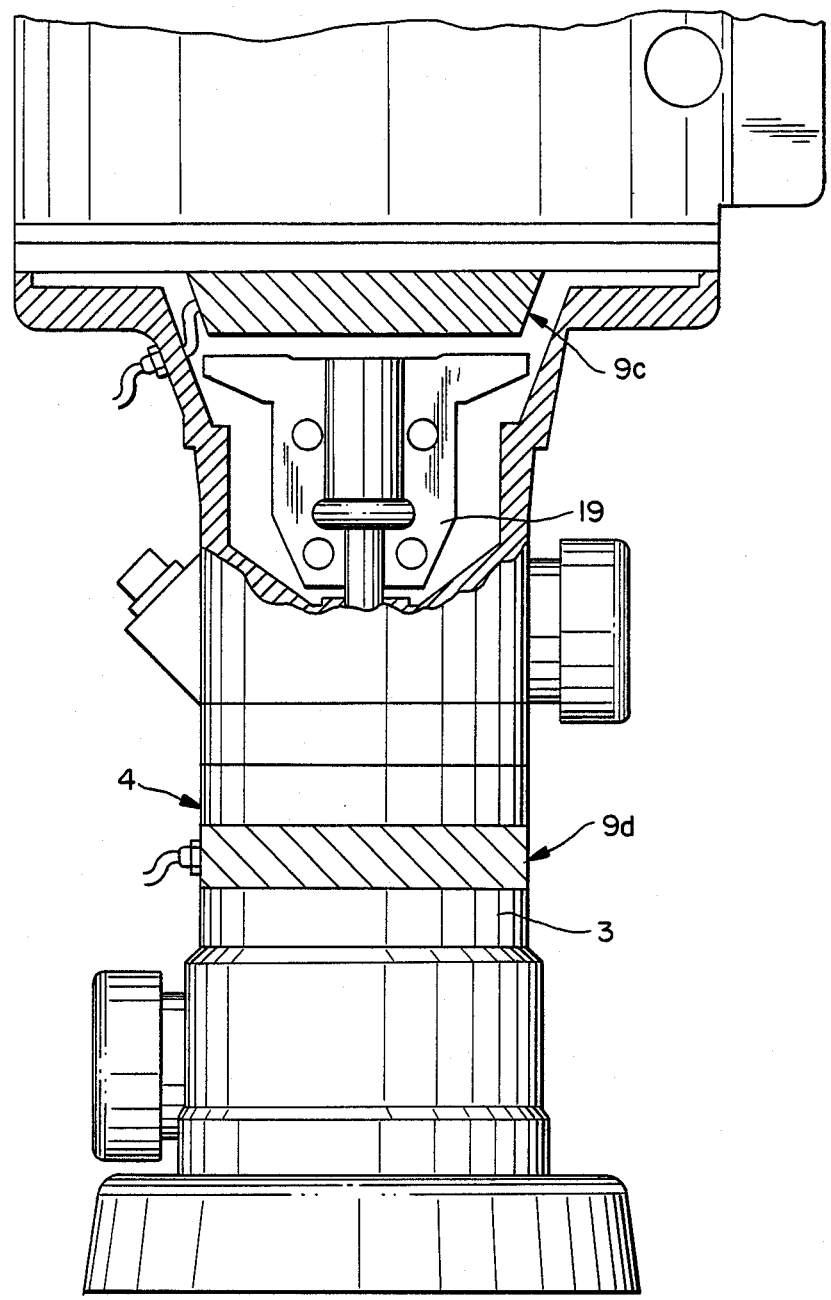

In the embodiment shown in FIG. 3 the frequency converter 9c is situated between the motor and the pump 4. A clutch 19 formed like a rotor or another, separately installed rotor (not shown) provides the cooling of the frequency converter.

If the outer dimensions of the frequency converter are adapted to the outer dimensions of the stepped chambers 3, the frequency converter 9d can also be arranged between two pump steps 3 in the flow path of the fluid, cf. FIG. 3.

With very hot fluids, it is advantageous to employ ducted cooling of the frequency converter, cf. FIG. 2. The connections 16 and 18 are removed and the bores 14 and 15 are closed off. The frequency converter 9b is connected to an external cooling arrangement via two connections 20 and 21 (depicted with dashed lines). The converter is provided with a coolant flowing through the cooling channels of the frequency converter and absorbing dissipation heat, emitting the heat via the connection 21.

FIG. 4 shows yet another embodiment of a frequency converter 9 in a sectional view. It includes a liquid-proof capsule made of two parts 22 and 23 provided with a filling 24 of pourable solid stabilizing the capsule. The electronic equipment 26 of the frequency converter situated in the bottom 23 of the capsule on a support 25 is surrounded by the solid filling 24 and by a liquid 27 so that the frequency converter operates as a heat-pipe system. In the bottom part of the capsule the liquid fills the space between the particles of the solid and vaporizes when the dissipation heat is sufficiently high. The vapor rises between the particles of the solid and finally condenses at a wall 22 of the capsule. The condensate is returned to the bottom part of the capsule.

It is known that the output signal of the frequency converter can be changed by actuating circuit elements. These circuit elements 28 are no longer accessible from the outside due to the encapsulation of the frequency converter. Consequently they must be actuated from the outside through the wall 22 of the capsule either mechanically or electromagnetically. The frequency converter can, for example, be mechanically actuated by deforming the comparatively thin wall of the capsule with a tool, where the circuit elements 28 are situated, for triggering the corresponding electronic processes. Another possibility is to actuate the contacts of the circuit elements by means of an electromagnet, thus adjusting the desired output signal of the frequency converter.

Furthermore it is advantageous to provide the frequency converter with plug contacts 29, connected to the input and the output of the frequency converter on the one side and, on the other side, being slidable onto counter contacts for establishing a connection with the main circuit, the stator windings and the external sensors.

Arranging the frequency converter within the pump or the motor results in a sufficient shielding to the ambient. As another consequence the usually long and shielded off connections to external frequency converters installed at a distance from the pump assembly become superfluous.

The frequency converter is miniaturized by means of highly integrated circuits, field-controlled transistors being suitably used in the output circuit of the frequency converter. A minimum size of the frequency converter can especially be achieved by providing a faultless emission of dissipation heat according to the above description.

It should be noted that not all parts of the frequency converter have to be installed inside the capsule. The capacitor 30 of the intermediate circuit of the frequency converter inside the capsule, cf. FIG. 4, can also be arranged outside the capsule, cf. FIG. 2. The same applies correspondingly to the inductance of the intermediate circuit, if the frequency converter operates with current accumulation and not with voltage accumulation. An external arrangement of the intermediate circuit results in a further miniaturization of the frequency converter. So-called direct transformers operating without intermediate circuits are also included in the term "frequency converter" of the present invention.

The operational value determined by the output circuit of the frequency converter can also be controlled by internal or external signals. For this purpose the frequency converter is provided with internal sensors, such as those reacting to current, voltage or temperature, or with external sensors and servo components, all of them connected to the controller of the frequency converter. Such external sensors can react to, for example, pressure, flow volume and temperature of the pump assembly. External servo components are, for example, time components switching off and on certain operational modes of the frequency converter for predetermined periods of time.

We claim:

1. A pump assembly for delivering fluid, comprising a pump having a primary flow channel and a electromotor driving the pump, a parameter of said electromotor being variable by means of a static frequency converter, wherein the frequency converter is miniaturized using highly integrated circuits and is coupled to the pump assembly, and whereby the dissipation heat of the frequency converter is emitted by fluid which has entered the pump assembly, said fluid acting as a dissipator, wherein the frequency converter is arranged in a bypass flow channel of the pump, said bypass flow channel having an inlet which communicates with said primary flow channel at a first location and an outlet which communicates with said primary flow channel at a second location.

2. A pump assembly as claimed in claim 1, wherein the housing of the frequency converter is a capsule (22, 23) pressure-resistant and leakproof towards the ambient and at least partially provided with a filling (24, 27) acting as heat conductor for the dissipation heat emitted to the surface of the capsule.

3. A pump assembly as claimed in claim 2, wherein the filling (24, 27) stabilizes the shape of the capsule (22, 23).

4. A pump assembly as claimed in claim 2, wherein the filling is a pourable solid.

5. A pump assembly as claimed in claim 2, wherein the filling is a liquid.

6. A pump assembly as claimed in claim 2, wherein the filling (24, 27) is a pourable solid and a liquid, the latter filling part of the space between the solid particles for forming a heat-pipe-system in such a way that the liquid vaporizes where the dissipation heat is developed and the vapor condenses on the inner surface of the capsule while emitting condensation heat.

7. A pump assembly as claimed in claim 2, with the output signal of the frequency converter being variable by actuating circuit elements, wherein the circuit elements (28) are indirectly actuateable from the outside through the wall (22) of the capsule either mechanically or electromagnetically.

* * * * *